Jan. 14, 1964 R. G. HEDTKE 3,117,406
BALER
Filed April 2, 1962 7 Sheets-Sheet 1

INVENTOR.
ROBERT G. HEDTKE
BY Carlsen and Carlsen
ATTORNEYS

Jan. 14, 1964  R. G. HEDTKE  3,117,406
BALER
Filed April 2, 1962  7 Sheets-Sheet 2

INVENTOR.
ROBERT G. HEDTKE
BY Carlsen and Carlsen
ATTORNEYS

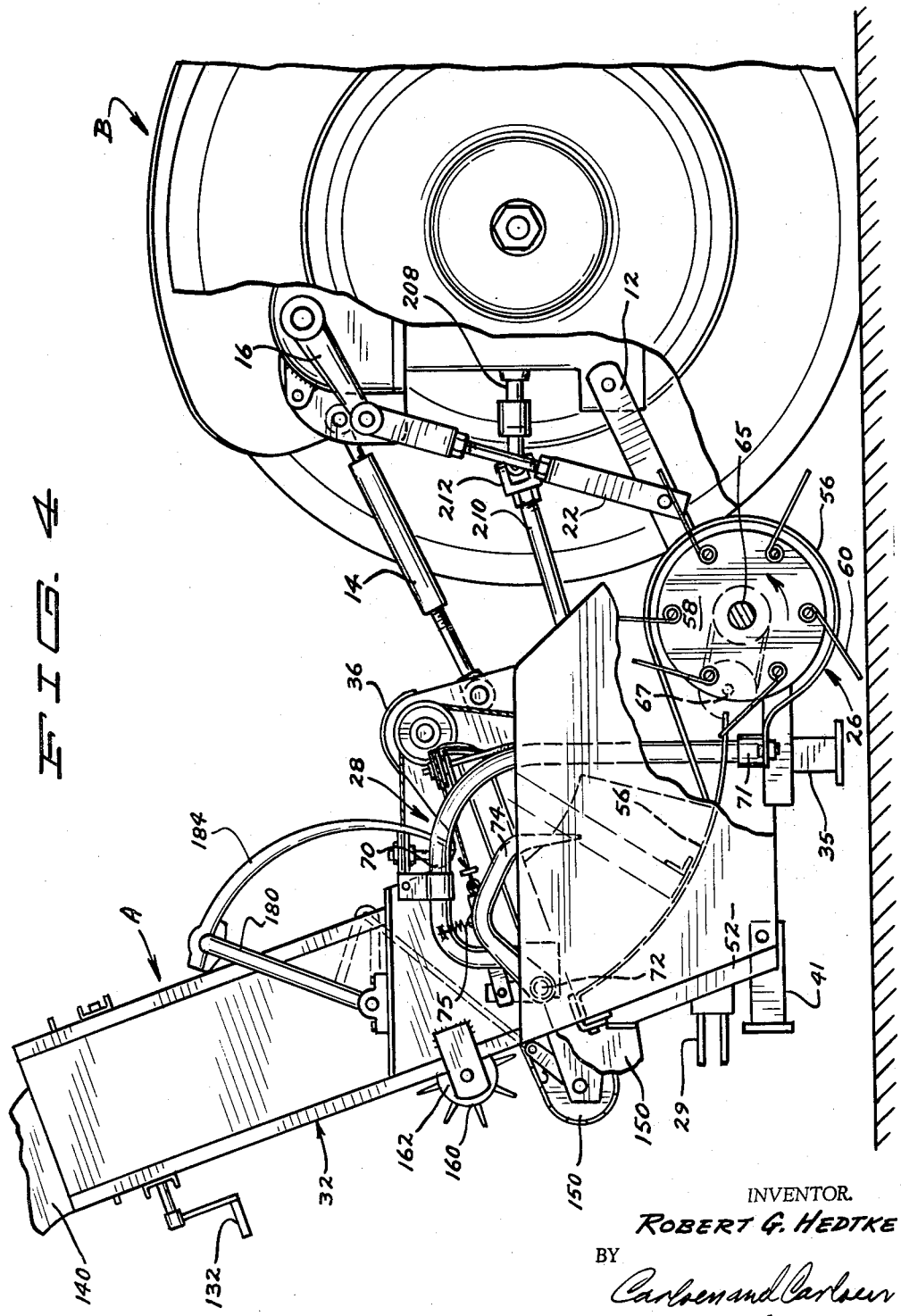

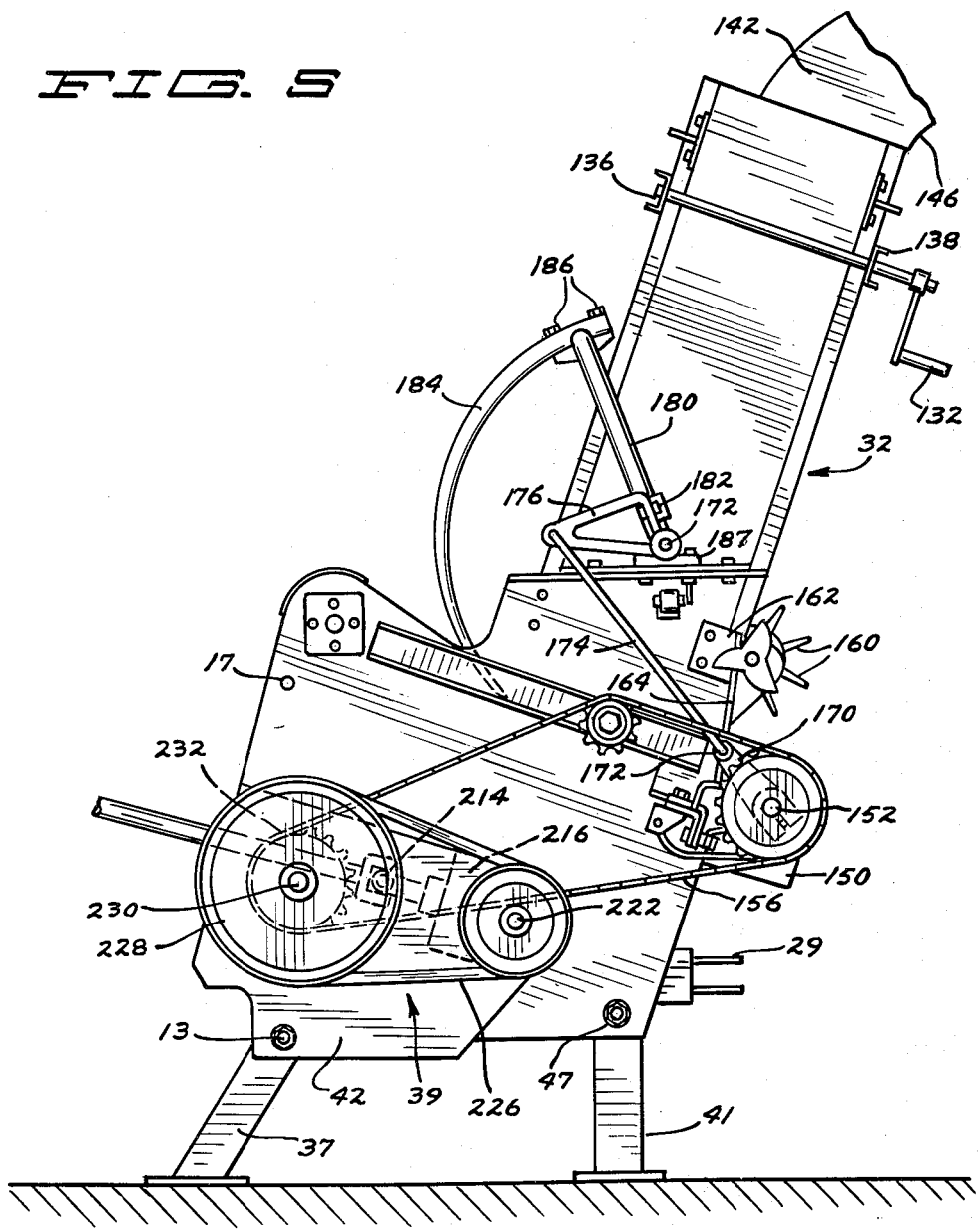

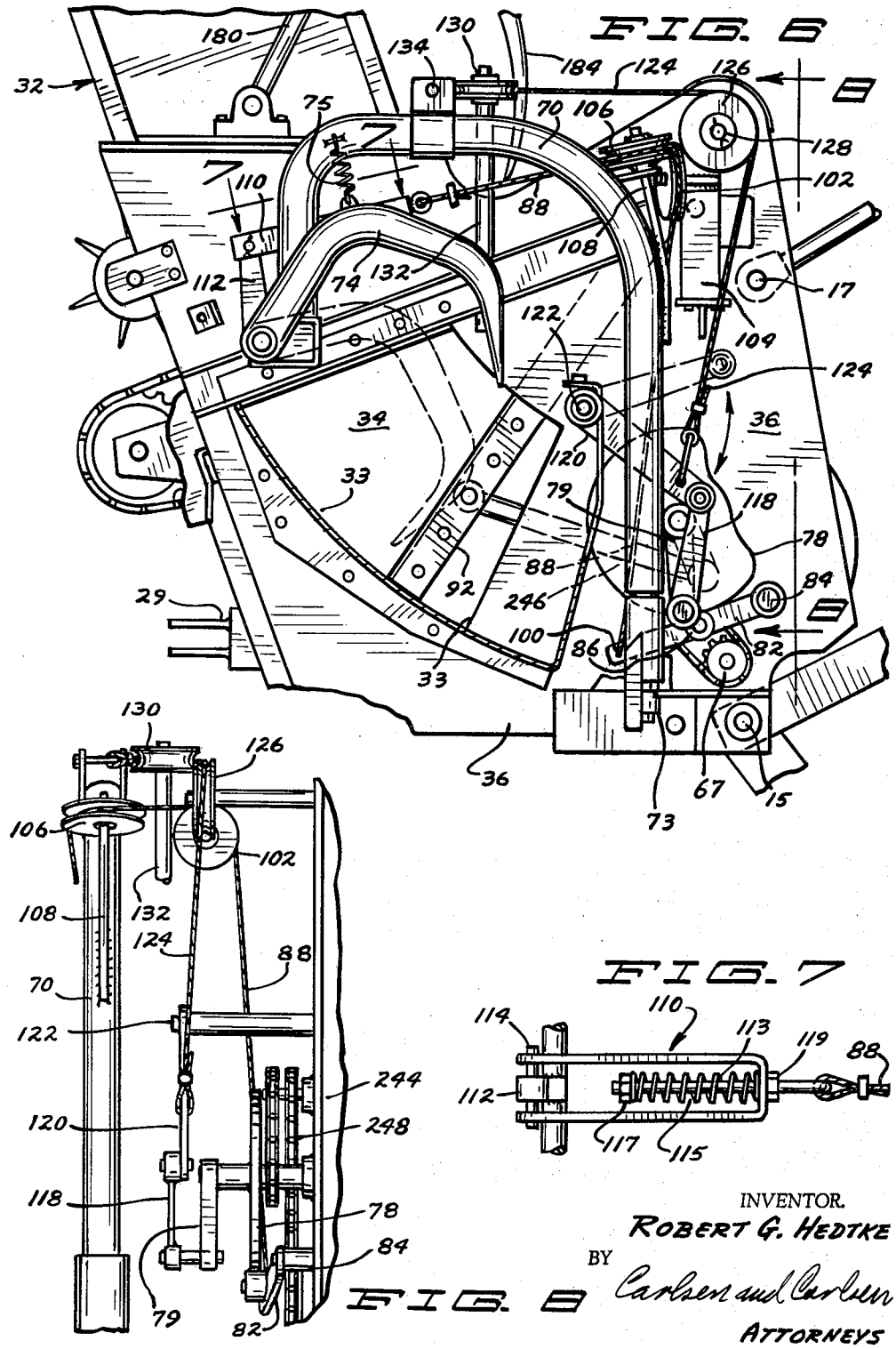

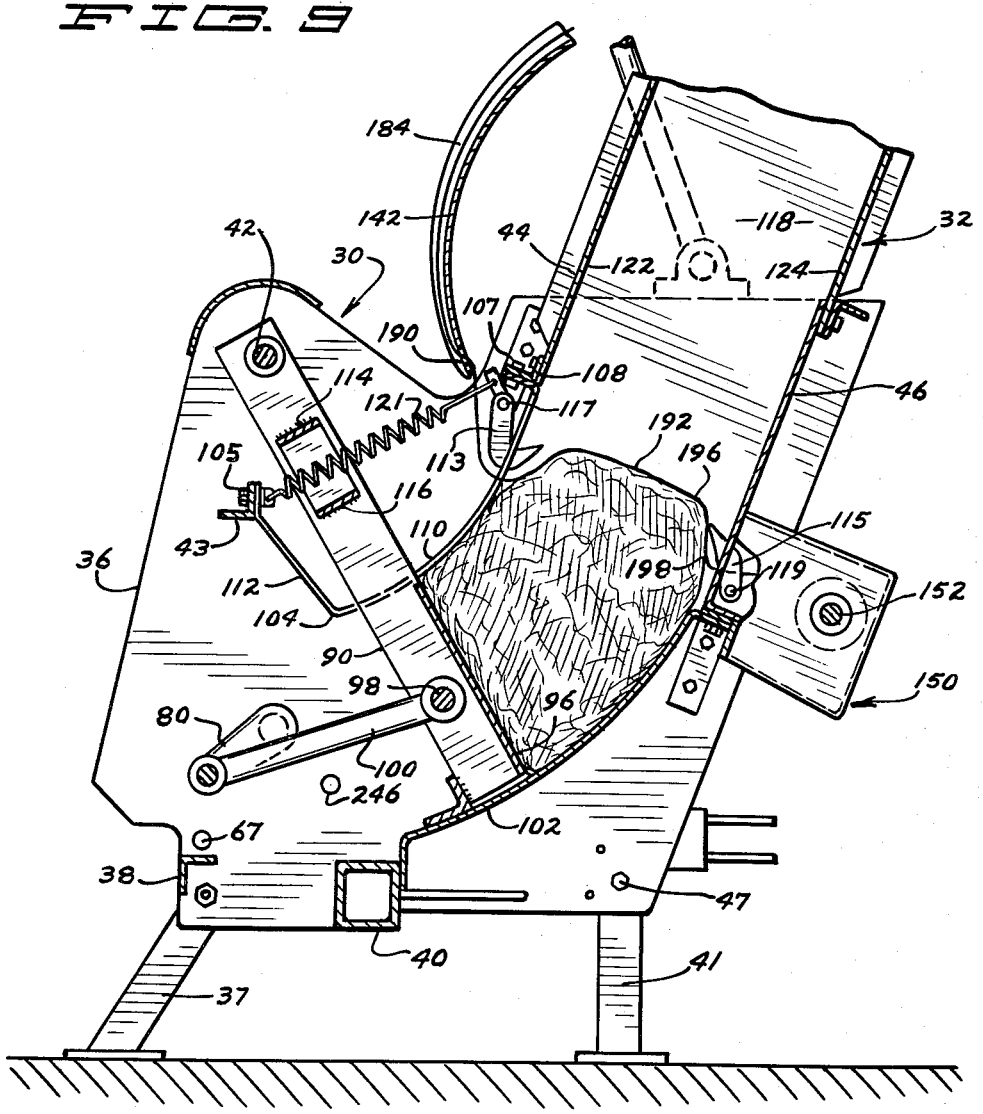

Jan. 14, 1964    R. G. HEDTKE    3,117,406
BALER
Filed April 2, 1962    7 Sheets-Sheet 7

INVENTOR.
ROBERT G. HEDTKE
BY
Carlsen and Carlsen
ATTORNEYS

United States Patent Office 3,117,406
Patented Jan. 14, 1964

3,117,406
BALER
Robert G. Hedtke, Excelsior, Minn., assignor, by mesne assignments, to Minneapolis-Moline, Inc., Hopkins, Minn., a corporation of Delaware
Filed Apr. 2, 1962, Ser. No. 184,120
9 Claims. (Cl. 56—341)

The present invention relates generally to improvement in balers and of the type used for picking up and compressing fibrous material into rectangular bales.

Such machines are primarily used for baling hay, straw and the like and as a matter of convenience the material being baled will hereinafter generally be referred to as hay.

Many machines have been previously proposed for the general purposes described above. In most instances, these machines include an elongate horizontally disposed baling chamber in which a baling plunger is mounted for reciprocal movement. A means is provided for feeding hay from the top or the side of the baler into the baling chamber in advance of the plunger. The apparatus is ordinarily carried on a frame provided with wheels so that it can be towed behind the tractor, and can either be self-powered or provided with a drive shaft for transmitting power from the power take off of the tractor. The bales are bound by means of an automatic tieing or knotting assembly provided on the machine. The knotting assembly operates in conjunction with one or more needles which draw twine or other tieing material across the baling chamber. After the bale has been formed, the needles return a portion of the twine across the chamber so that the bales are properly wrapped with twine. The apparatus also commonly includes a special mechanism for lifting or throwing the newly formed bales from the baler into a wagon towed behind the baler.

There are various disadvantages in such machines. One important disadvantage of prior machines derives from the fact that the train of vehicles used in a baling operation is often of such a great length as to make it difficult for the operator to negotiate turns. The vehicle train ordinarily includes a tractor, a baler and a wagon and the large turning radius of such a train of implements interferes with efficient operation, makes it difficult to turn around in storage areas and results in the wasting of crops near fences and in the corners of a field.

Another shortcoming of many prior balers results from the large size and bulk of the baler framework with which the additional weight of the wheels causes the apparatus to be extremely heavy and also increases manufacturing costs.

A still further disadvantage of many prior baling mechanisms is due to the need for an elevator means or throwing mechanism for transporting the bales from the bale case into a wagon trailing behind the baler. This mechanism, of course, substantially increases the weight of the baler and adds to the manufacturing costs.

Still a further disadvantage of some prior baling machines results from the fact that the conveyor means for transporting the hay laterally of the pick up mechanism and into the bale case is often relatively large in size, complicated in construction and therefore expensive to manufacture.

In view of the deficiencies of the prior art, it is thus one object of the present invention to provide an improved baler wherein the weight and size of the supporting framework is reduced and support wheels are eliminated.

It is yet another object of this invention to provide an improved baler characterized by being relatively small in size and compact in construction.

It is still another object of this invention to provide an improved baler wherein the length of the baler from its forward to its rearward end is considerably less than prior balers whereby the operator can more easily negotiate turns.

It is yet another object of the present invention to provide an improved baler wherein a means is provided for eliminating the conventional conveyor or throwing mechanism employed to transport the finished bales from the baler into a wagon positioned behind the baler.

It is still another object of the present invention to provide a baler having an improved lateral transport mechanism characterized by more positive action and by a reduction in weight.

It is yet another object of the present invention to provide an improved baler carried upon and supported by means of rearwardly extending hitch arms or hitch linkage members provided upon a tractor.

It is yet another object of the present invention to provide a baler having an improved means for transporting the hay from the pick up mechanism to the packing mechanism including a plurality of feed arms, means of oscillating the arms laterally and a means for rendering the feed arms ineffective in moving the hay in timed relationship with the lateral oscillating movement of the fork frame member and driving the portion of the cycle of oscillation in which the feed arms move away from the bale packing mechanism.

These and other more detailed and specific objects will be disclosed in the course of the following specification, reference being had to the accompanying drawings, in which—

FIG. 4 is a right side elevational view partly broken away of the baler according to the present invention supported from a tractor.

FIG. 5 is a left side elevational view of the baler as it appears when removed from the tractor.

FIG. 6 is a vertical sectional view taken on line 6—6 of FIG. 2.

FIG. 7 is a plan view taken on line 7—7 of FIG. 6.

FIG. 8 is a partial front elevational view taken on line 8—8 of FIG. 6.

FIG. 9 is a partial vertical sectional view taken on 9—9 of FIG. 2.

Briefly stated, the present invention provides a baler having a hay pick up mechanism for carrying cut hay from the ground into the apparatus, a lateral transport mechanism to convey hay horizontally, a hay packing mechanism, a bale case and a tieing mechanism. The entire apparatus is mountable upon linkage members of conventional construction which project rearwardly from a tractor. Preferably the baling apparatus itself is not provided with wheels.

The packing mechanism preferably comprises a plunger in the form of a pivotally mounted vane and a drive means is provided for oscillating the vane through an arc extending between the forward end of the packing mechanism and the bale case.

The lateral transport mechanism preferably comprises a plurality of laterally spaced apart hay feed arms mounted for pivotal movement about a horizontal axis and adapted to be raised and lowered simultaneously. The hay feed arms are carried by a movable support member adapted to swing the feed arm as a unit along a laterally disposed path and a means is provided for co-ordinating the up and down swinging movement of the feed arms with the lateral movement thereof. The movement of the feed arms is also co-ordinated with the movement of the plunger so that the hay will be conveyed thereby into the packing assembly when the plunger is in its retracted position.

The invention will be best understood by reference to the drawings and description set forth below wherein the same numerals refer to corresponding parts in the several views.

The improved hay baler, as disclosed herein, is intended for support upon and operation in conjunction with any of various tractors of the type provided with rearwardly extending vertically swinging hitch links which can, for example, be similar in construction to the links 12 and 13 of the Evans patent, No. 2,575,801. Such hitch assemblies are well known and are often referred to as a "three point hitch."

Figure 1:
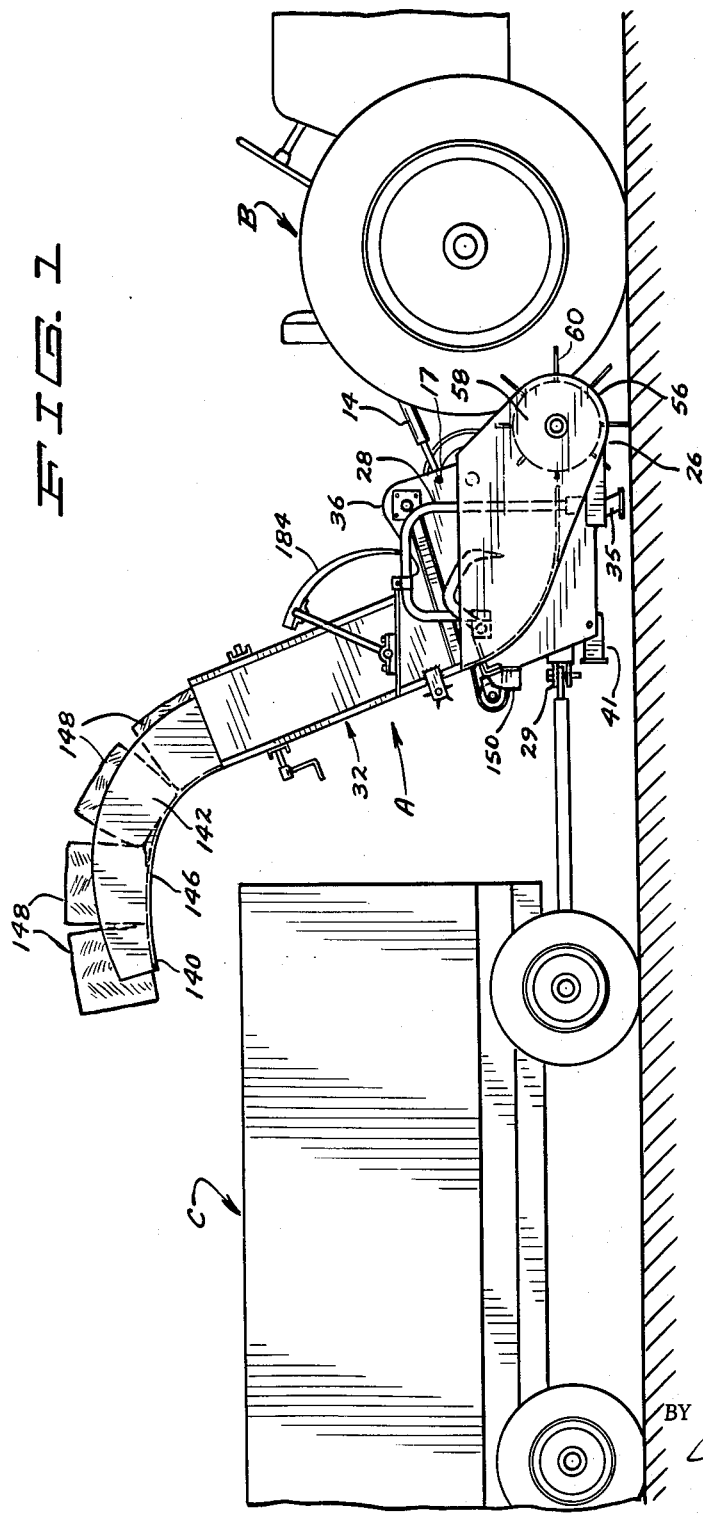
FIG. 1 is a side elevational view of a baler according to the present invention supported upon a tractor.

As can be seen in FIG. 1, the baler A is mounted upon a tractor B characterized by the provision of an elongate longitudinally extending chassis upon which is mounted the usual engine, transmission, operator's station and other parts to make up a self-propelled tractor unit. A hay wagon C is preferably connected to the rearward end of the baler A during operation.

The tractor B is provided at its rearward end with three rearwardly extending hitch linkage members designated 10, 12 and 14. These linkage members may be raised and lowered in accordance with prior practice by means of a pair of powered operating levers 16 and 18 which extend rearwardly from the tractor above the links 10 and 12 respectively. A pair of connecting links 20 and 22 transmit motion from the rearward end of the operating levers 16 and 18 to the links 10 and 12.

The rearward ends of the links 10, 12 and 14 are pivotally connected at 13, 15 and 17 respectively to the baler A by means of suitable pivot pins or other suitable known connecting means. The length of the link 14 and the links 22 and 20 preferably are adjustable.

The baler B comprises three general parts. A hay pick-up mechanism indicated generally at 26, a lateral transport mechanism 28, packing mechanism 30 and a bale case 32. The baler supporting framework includes a pair of vertically positioned laterally spaced apart side plates 34 and 36 which define the side walls of the packing mechanism 30. The spacing of the lower ends of the plates 34 and 36 is established by means of suitable cross members, such as members 38 and 40 best seen in FIG. 9 each of which is suitably secured, as by welding, to the lower ends of the plates 34 and 36. Spacing between the upper ends of the plates 34 and 36 can be established by means of cross members in the form of a pivot pin 42 and angle iron 43 best seen in FIG. 9 and also by means of longitudinally spaced plates 44 and 46 which comprise a portion of the forward and rearward walls of the bale case 32 described more fully hereinbelow.

A suitable inlet opening 33 is provided in the side plate 36 of the packing assembly between the packing assembly and the lateral transport mechanism 28 to provide an entrance passage through which the hay can be moved from the lateral transport mechanism into the packing assembly.

As can be seen in FIG. 5, at the forward and lower ends of the plates 36 and 34 are rigidly secured a pair of downwardly extending supporting legs 35 and 37 respectively. At the rearward end of the bottom of the baler there is provided a cross member 47. Pivotally mounted upon the cross member 47 is a third leg 41 which can be swung upwardly and suitably secured in the raised position below the tow bar bracket 29, as shown by dotted lines in FIG. 5. Any suitable fastening means of known construction can be used to secure the leg 41 in its elevated position.

Figure 2:
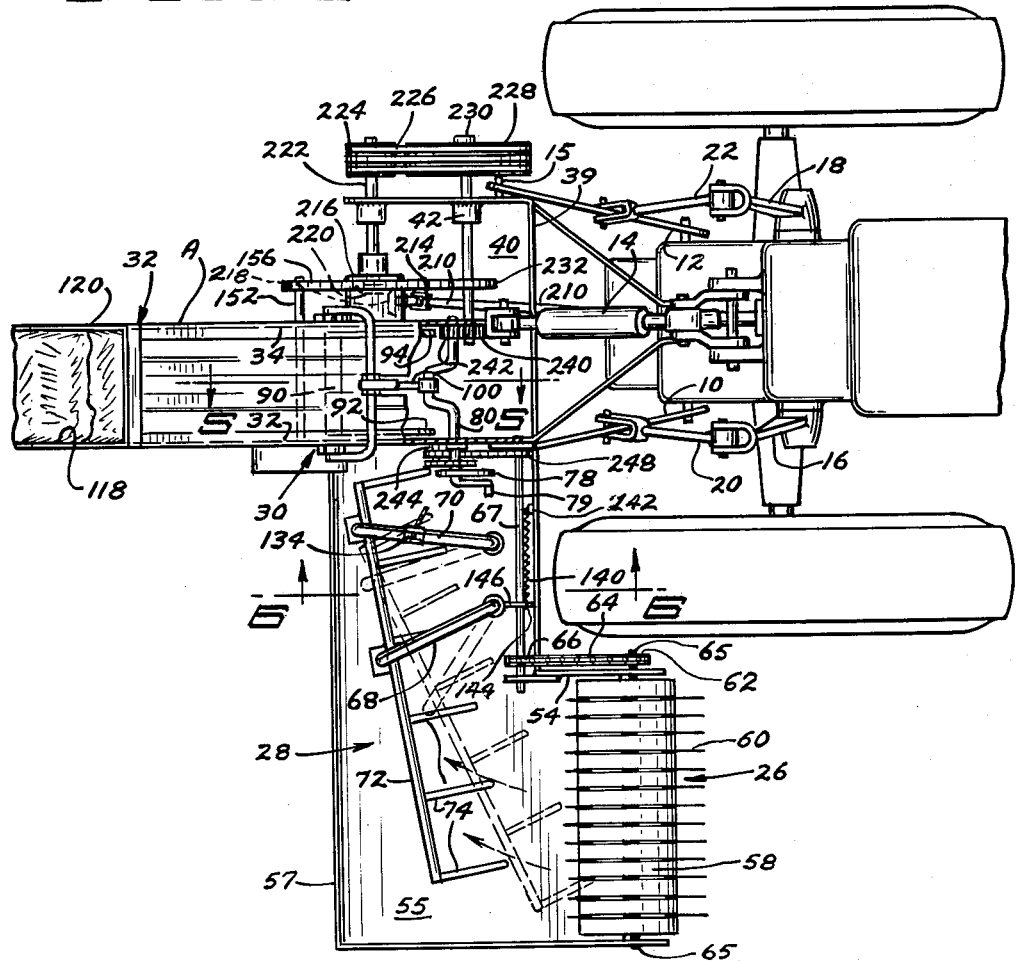
FIG. 2 is a plan view partly in section of the baler illustrated in FIG. 1.

Extending laterally from the plate 34 and rigidly connected thereto is a shaft support 39 including a horizontally disposed member 40, best seen in FIG. 2, and a vertically disposed member 42, best seen in FIG. 5. The plate 42 is provided with suitable journals for drive shafts described hereinbelow.

On the opposite side of the packing mechanism 30 from the drive shaft support 38 is provided the pick up mechanism 26 and the lateral transport mechanism 28. The front end of the left side of the baler as viewed in FIG. 1 comprises the feed housing 50 made up of suitably reinforced sheets including side walls 52 and 54, a bottom wall 55 and a rear wall 57.

Figure 3:
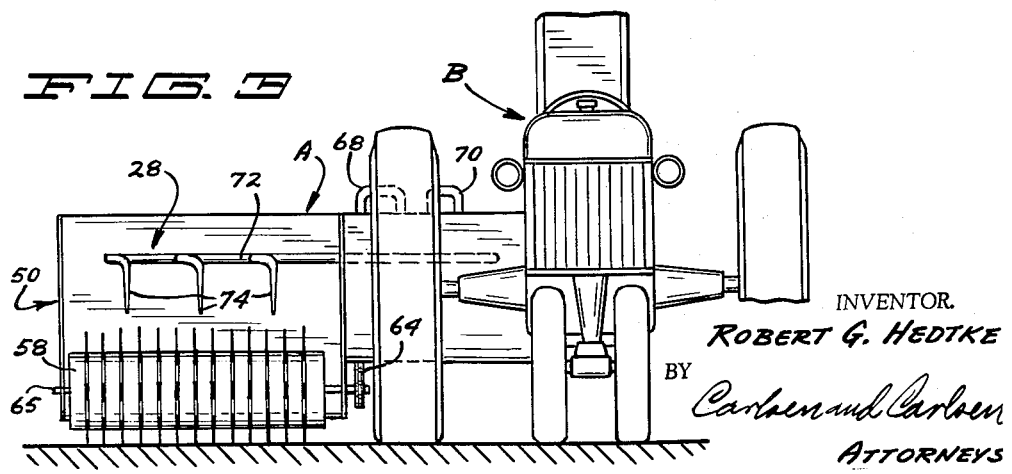
FIG. 3 is a partial front elevational view of a tractor and baler according to the present invention.
Figure 11:
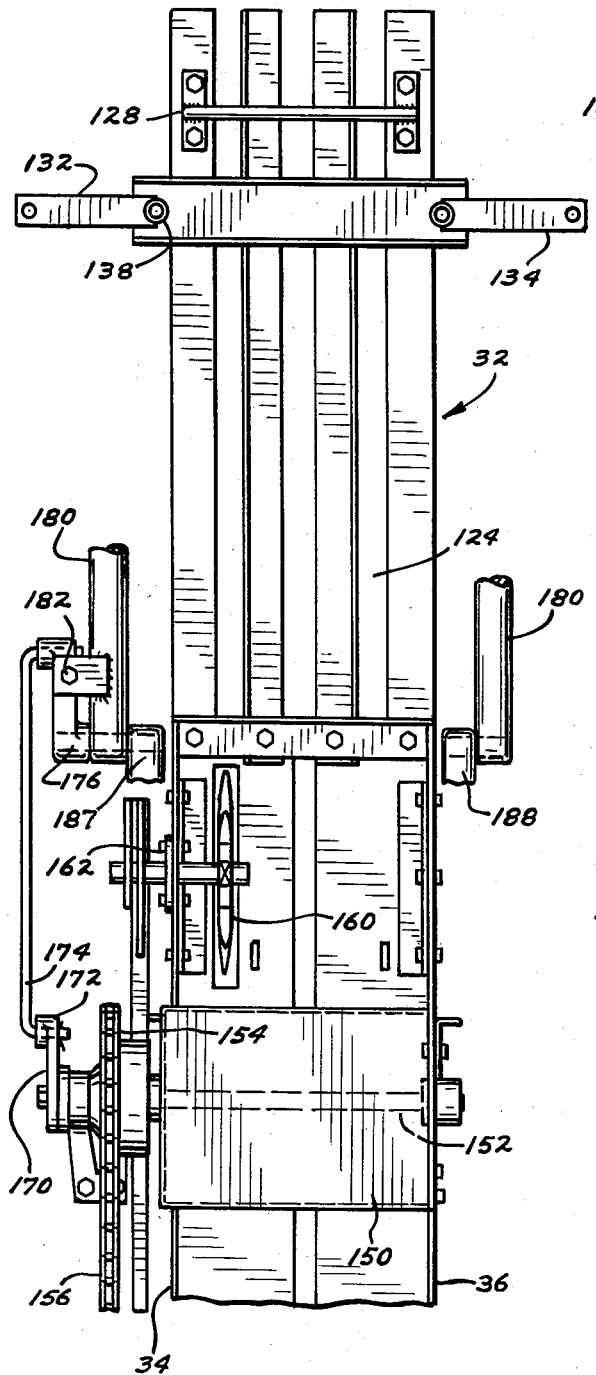
FIG. 11 is a partial rear elevational view of the bale case and packing mechanism.

At the forward end of the feed housing are provided a plurality of laterally spaced apart forwardly and then rearwardly extending stripper bands 56 partially surrounding a pick up drum 58 which is itself mounted upon a support shaft 65. Upon counterclockwise rotation of the pick up drum 58, as seen in FIGS. 1 and 4, radially extending fingers 60 will pick up hay from the field and will force it rearwardly over the stripper bands 56 and onto the bottom wall 55. The pick up unit 50 is entirely conventional in its construction and operation and therefore will not be described in detail. As can be seen in FIGS. 1, 2 and 3, the drum 58 is driven by the provision on one end of the support shaft 65 of a sprocket 62 connected by means of a sprocket chain 64 to a sprocket 66 mounted upon a powered stub shaft 67 which will be more fully described hereinbelow.

The lateral transport mechanism 28 includes a pair of vertically and then rearwardly extending members or arms 68 and 70 which are connected at their lower ends to the bottom wall 56 upon suitable pivots 71 and 73 respectively. The members 68 and 70 are thus mounted for pivotal movement about a vertical axis. The rearward ends of the members 68 and 70 include downwardly extending portions which are pivotally connected to a horizontally disposed and laterally extending support member 72. Extending forwardly and downward from the support arm 72 are provided a plurality of laterally spaced apart curved hay feed arms 74. The hay feed arms 74 are each rigidly connected to the support arm 72 and will move upwardly and downwardly as the support member is pivoted about its longitudinal axis. The feed arms 74 are yieldably biased upwardly by means of a spring 75 connected between arm 74 and support arm 70 as seen in FIG. 6.

Operation of the lateral transport mechanism is accomplished by means of a cam 78 and crank arm 79 mounted upon one end of a plunger operating crank 80. Pivotally connected to the side wall 32 of the packing case is a cam follower arm 82. The follower arm 82 is adapted to pivot about a fixed pivot pin 84 secured to wall 32. At approximately the center of the follower arm 82 is a cam follower roller 86 positioned to contact the peripheral edge of the cam 78. At the end of the arm 82 opposite the pivot pin 84 and secured thereto at 100 is an elongate connecting member or cable 88 best seen in FIGS. 6 and 8. The cable 88 extends upwardly from the follower arm 82 and is entrained over a first pulley 102 which is itself rotatably mounted upon wall 36 by means of a support bracket 104. The cable 88 then passes around a pulley 106 which is mounted upon bracket 108 secured to the support member 70. From pulley 106 the cable 88 extends to a resilient coupling 110 which is pivotally connected to lever arm 112 by means of pivot pin 114. The yieldable connecting member 110 can comprise a generally U-shaped member 111 secured at its terminal ends to the pivot pin 114 and provided with a central bolt 113 which is slidably mounted through a suitable opening in the end of member 111 opposite the pivot pin 114. Positioned around the bolt 113 is a helical spring 115. The rearward end of spring 115 can be held on bolt 113 by means of a nut 117 threaded onto the bolt 113. The spring tension exerted by the spring 115 can be adjusted by changing the position of a second nut 119 threaded upon the bolt 113 to thereby compress these springs 115 to the desired length.

The lever arm 112 is rigidly secured to the support arm 72 and extends radially therefrom so that upward and downward movement of the cam follower lever 82 during rotation of the operating cam 78 will cause a corresponding rocking movement of the lever arm 112, an oscillating movement of support arm 72 about its own axis and a consequent upward and downward swinging movement of the hay feed arms 74.

The free end of the crank arm 79 has pivotally secured to it a connecting rod 118. Pivotally connected to the opposite end of the connecting rod 118 is a rocker arm 120. The rocker arm 120 is pivotally secured to the wall 32 upon a pivot pin 122. Near the end of the rocker arm 120 secured to the connecting rod 118 is attached the lower end of an elongate connecting member, such as cable 124. The cable 124 extends upwardly from the rocker 120 and is entrained over a pulley 126 suitably mounted upon a supporting bracket 128 which is attached to the wall 32 of the packing mechanism. The cable 124 extends rearwardly from the pulley 126 in a horizontal plane is then entrained over a second pulley 130 supported from the wall 36 by suitable bracket member 132. From the pulley 130, the cable 124 extends laterally and is suitably secured to the support member 70 at 134. It will thus be understood that when the outward end of the crank arm 79 moves downwardly, the connecting rod 118 and the outward end of the rocker arm 120 will also move downwardly thereby drawing the lower end of cable 124 downwardly. This tension exerted upon the cable 124 will cause the rearward end of the support member 70 to move laterally or to the right as viewed in FIG. 2. The movement of the rearward end of the member 70 to the right will, of course, move the member 72 in the same direction and will therefore cause the rearward end of the member 68 to move to the right about pivot 71. The assembly comprising the support members 68 and 70 and the support arm 72 are resiliently and yieldably biased against the tension of the cable 124 through the action of a yieldable biasing means, such as a helical spring 140 secured at one end 142 to the frame of the lateral transport mechanism and at the opposite end 144 to an arm 146 which is rigidly secured to the support member 68 and extends forwardly therefrom as can be seen in FIG. 2.

Figure 10:
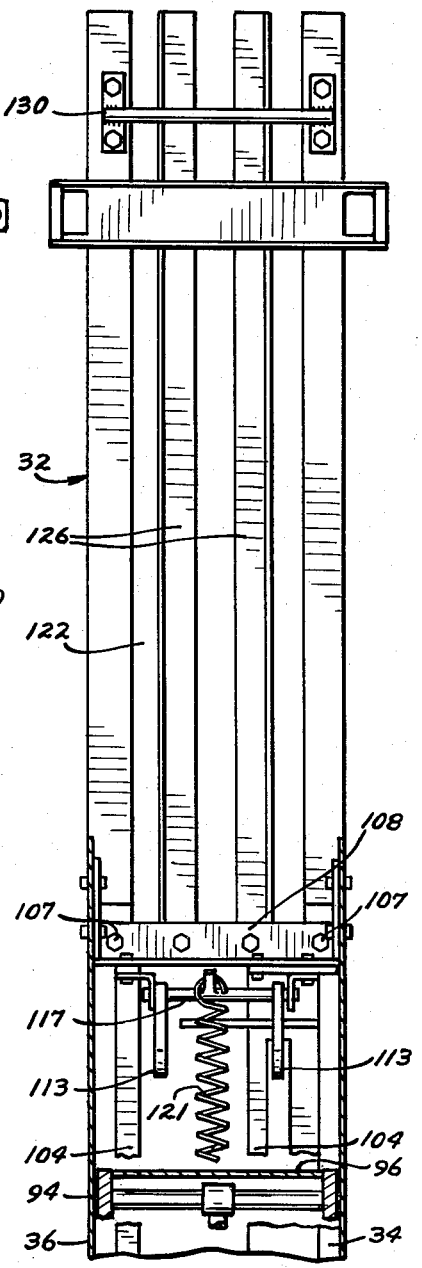
FIG. 10 is a partial front elevational view of the bale case and packing mechanism.

The packing mechanism 30 is bounded on the left, as seen in FIG. 2, by the wall 36 and on the right by the wall 34. Pivotally mounted within the packing chamber between the walls 34 and 36 is a packing vane or plunger 90. The plunger 90 includes a pair of generally inclined laterally spaced apart and parallel frame members 92 and 94, as can be best seen in FIGS. 6, 9 and 10. These members are pivotally mounted upon the plunger pivot pin 42 extending in a horizontal plane across the width of the packing assembly at the upper end thereof. A generally rectangular plate 96 extends between the members 92 and 94 and is secured rigidly thereto as by welding. A pivot pin 98 extends between the frame members 92 and 94. To this pin is pivotally secured a connecting rod 100. Other cross members such as 114 and 116 can be suitably secured between the frame members 92 and 94 for the purpose of providing additional strength. The other end of rod 100 is pivotally connected to a crank 80. Thus, during operation, rotation of the crank 80 through its connection with the plunger 90 by the means of connecting rod 100 will cause the free end of plunger 90 to oscillate within the lower end of packing assembly 30 as can be best seen in FIG. 7.

The lower end and rearward aspect of the packing assembly 30 is composed of a wall 102 formed from a curved metal sheet defining a portion of a cylinder having the pivot pin 42 at its center. Wall 102 is secured on either side edge to the wall members 34 and 36. The upper wall of the packing assembly is defined by a plurality of laterally spaced apart parallel and curved bands 104 which can be secured at their forward ends by bolts 105 to the cross member 43. The rearward ends thereof can be secured by bolts 107 to a cross member 108. A portion 110 of each of the bands 104 is made in the form of an arc having the pin 42 at its center. The forward portion 112 of each band projects upwardly and is secured to the cross member 43.

As can be best seen in FIG. 7, there is provided a pair of forward hay dogs 113 and a pair of rearward hay dogs 115. The hay dogs 113 and 115 are mounted upon the support shafts 117 and 119 respectively at the forward and rearward edges of the bale case 32. A suitable yieldable biasing means, such as a helical spring 121, can be connected between the support shaft 117 and the framework of the baler for yieldably biasing the pointed ends of the hay dogs 113 centrally of the bale case thereby assuring that the hay within the bale case will move in only one direction. A similar yieldable biasing means (not shown) can be operatively connected to the hay dogs 115 to yieldably bias the pointed ends thereof inwardly in a manner similar to the operation of the spring 121.

At the upward and rearward aspect of the packing assembly 30 is provided the bale case 32. The bale case 32 includes laterally spaced apart vertically positioned side walls 118 and 120 which are coextensive with the plates 36 and 34. The baling case 32 also includes forward and rearward walls 122 and 124 respectively formed from laterally spaced apart flat bands 126. The bands 126 can be secured against outward movement at the upper ends by means of suitable retainer members 128 and 130 extending across the forward end and rearward end of the bale case. The upper ends of the bands 126 can be adjustably positioned by means of cranks 132 and 134 of any known construction screw threaded between laterally extending cross members 136 and 138 to change the compression of the bales for different operating circumstances. Secured to the upper end of the bale case 32 is a rearwardly curved drop chute 140 which includes spaced apart side walls 142 and a bottom wall 146. The drop chute 140 will carry the bales 148 rearwardly as they pass upwardly out of the bale case 32. Bales moving through the chute 140 will drop from the rearward end thereof into the wagon C.

As can be seen in the figures, particularly 1, 4 and 5, the bale case 32 is positioned substantially vertically but is preferably inclined slightly to the rear or the left as seen in FIG. 1. While the angle of inclination of the bale case in respect to the vertical can be varied somewhat without substantially interfering with proper operation, I prefer to incline the bale case 32 at about a 20 degree angle with respect to the vertical.

At the rearward end of the packing assembly 30 is provided a knotter 150 of any suitable known construction. The knotter includes a drive shaft 152 to which is secured a drive sprocket 154. Entrained over the sprocket 154 and extending over a sprocket 232 mounted upon a shaft 230 is a drive chain 156. Operatively associated with the knotter 150 is a star wheel assembly 160 of known construction. The assembly 160 is rotatably mounted on a bracket 162 secured to the rearward wall of the bale case 32. A slide bar 164 operates in conjunction with the star wheel conventionally to determine the length of the bale formed by the baler. Many knotting mechanisms and bale length determining devices have been previously described and are well known to those skilled in the art. Since any of the previously described and well known knotting mechanisms and bale length determining devices can be used with the apparatus of the present invention, neither the knotter nor the bale length determining mechanisms will be described in further detail herein.

Rigidly secured to the outward end of the shaft 152 is a crank 170. Pivotally secured to the outward end of the crank arm 170 at 172 is an upwardly extending link member 174. The upper end of the link 174 is pivotally connected to a generally triangular shaped crank arm 176. The crank arm 176 is pivotally secured at 178 to a generally U-shaped needle carrying framework 180. The crank arm 176 is rigidly secured to framework 180 by means of a shear bolt 182 in such a manner that rotation of crank arm 170 will impart an oscillatory movement to the framework 180. A curved needle 184 is rigidly secured at its upper end to the framework 180 by bolts 186. In the event that the needle 184 strikes an obstruction, the bolt 182 will be sheared. The needle carrying framework 180 is pivotally mounted at its lower end on either side of the bale case 32 upon suitable pivot blocks 187 and 188.

The needle 184 is generally U shaped in cross sectional configuration and is provided at its tip with a thread opening 190 through which baling twine 192 extends. The twine extends from the tip of the needle 184 conventionally through the packing assembly at 194 across the bale case at 196 and into the knotting mechanism at 198.

During operation, as the hay moves into the packing assembly between the plunger 90 and the bale case 32, oscillatory movement of the plunger 90 will force the hay upwardly into the bale case against the twine 192 until the upper end of the newly formed bale extends upwardly into the bale case 32 a predetermined distance. The needle 184 will then bring a segment of the twine across the lower end of the newly formed bale and into the knotter 150 where the twine 192 will be knotted and cut conventionally. Since the operation of the needle 184 through the movement of the crank arm 174 and crank 176 is conventional, it will not be described in any further detil herein.

A preferred drive assembly for operating the packing assembly, lateral transport 28 and pick up mechanism 26 will now be described. Extending rearwardly from a conventional tractor power take-off 208 is provided a drive shaft 210. The drive shaft 210 can be coupled to the power take-off shaft 208 through a universal joint 212. The rearward end of the shaft 210, as can be seen in FIG. 2, is connected through a universal joint 214 to a gear box 216. A bevel gear 218 coupled to the universal joint 214 transmits power to a second bevel gear 220 which is secured to a shaft 222 extending laterally from the gear box 216. To the outward end of the shaft 222 is connected a sheave 224 over which is entrained a plurality of endless flexible belts 226 which pass over a larger and more massive sheave 228. The sheave 228 is mounted upon a drive shaft 230 and acts as a flywheel. The shafts 230 and 222 are suitably journaled upon the support plate 42. The sheaves 224 and 228 are spaced substantially to the right as seen in FIG. 2 from the packing assembly 30 for the purpose of at least partially balancing the weight of the pick up and lateral transport mechanism.

The shaft 230 projects centrally from the support plate 42 and is journaled at its inward end in the wall 34a of the packing assembly 30. Secured near the middle of shaft 230 is a sprocket 232 over which the drive chain 156 is entrained. At the medial end of the shaft 230 is secured a spur gear 240 and in driving engagement with the gear 240 is a second gear 242 as can be seen in FIG. 2. The gear 242 is secured to one end of the crankshaft 80. Thus, during operation, rotation of the shaft 230 imparts rotary movement to the crankshaft 80 thereby causing an oscillation of the plunger 90.

The opposite end of the crankshaft 80 extends outwardly through the wall 36 of the packing assembly and is provided at its outward end with the cam 78 and the crank 79. Crankshaft 80 is also provided with a suitable sprocket over which is entrained a drive chain 244 to supply power to a sprocket mounted upon a countershaft 246 journaled in the plate 36. The countershaft 246 is provided with a second sprocket over which is a drive chain 248 entrained. The drive chain 248 is also extended over a sprocket from the shaft mounted upon the shaft 67 thereby causing the rotation of the shaft 67. Rotary motion of the crankshaft 80 is, in this way, imparted to the shaft 67. As mentioned hereinabove, at the outward or left end of the shaft 67, as viewed in FIG. 2, there is provided a pulley 66 over which is entrained a chain 64. The chain 64 extends around a pulley secured to the support shaft 65 of the pick-up drum 58. Rotation of the stub shaft 67 will thus impart rotary movement of the pick-up drum 58.

*Operation*

The baler A is supported during storage upon the legs 35, 37 and 41 as can be clearly seen in FIG. 5. When the apparatus is to be used, a tractor such as the tractor B is moved into position in front of the baler so that the rearward ends of the hitch linkage members 10, 12 and 14 are positioned adjacent the pivot points 13, 15 and 17. The pivot pins of pivots 13, 15 and 17 are then inserted to connect the rearward ends of the hitch linkage members with the baler A. Power operated levers 16 and 18 are then raised under the operator's control so as to elevate the rearward ends of the linkage members 10, 12 and 14 and thereby raise the entire baler A upwardly from the surface of the ground. The pivoted support leg 41 can then be swung upwardly to the position shown in dotted lines in FIG. 5. The drive shaft 210 can then be suitably coupled to the power take off shaft 208. The baler can now be carried at the rearward end of the tractor B to the location where it is to be used. If a wagon C is to be towed behind the baler to receive the bales, the tow bar of the wagon C can be secured in any convenient way to the hitch 29.

When the location is reached at which the baling operation is to be commenced, the baler A is lowered by the operator until the ends of the fingers 60 on drum 56 contact the surface of the ground.

The baling operation is started by placing the power take-off shaft 208 in operation thereby transmitting power to the baler through the drive shaft 210. The tractor B is then driven across the field in the usual way with the pick-up mechanism positioned to extend across the path of the cut hay.

Power transmitted to the baler A through the drive shaft 210 will cause rotation of the bevel gear 218 which in turn will cause the bevel gear 220 to rotate. Power will be transmitted from the bevel gear 220 through shaft 222, sheave 224, belts 226, sheave 228 and shaft 230 to the gear 240. The gear 240 will in turn drive the gear 242 which is connected to the plunger operating crank 80. The movement of the plunger operating crank 80 will be transmitted through the connecting rod 100 to the plunger 90 and thereby cause the plunger to oscillate forwardly and rearwardly between the side plates 32 and 34 about the center of support shaft 42. The plunger 90 will thus swing back and forth continuously throughout operation of the baler.

Rotation of the shaft 230 will also be transmitted through the sprocket 232 and drive chain 156 to the shaft 152 to thereby drive the knotting mechanism, crank 170, link 174, support framework 180 and needle 184. Since the operation of the needle 184 and the knotting mechanism 150 is conventional, no detailed description of this operation will be provided herein.

Rotation of the plunger operating crank 80, will of course, also transmit power to the counter shaft 246 through the drive chain 244. Rotation of the counter shaft 246 will be transmitted to the stub shaft 67 through the drive chain 248. Rotation of the pick-up drum 58 will be accomplished by the chain 64 connecting the pick-up drum shaft 65 of the stub shaft 67.

Rotation of the crank 80 will also rotate the cam 78 and the crank 79. As can be best seen in FIG. 6 and FIG. 8, when the lobes of the cam 78 passes over the follower roller 86 of the follower lever 82, the lever 82 will pivot downwardly about the center of the pivot pin 84 thereby moving the lower end of the connecting cable 88 downwardly. As the lower end of cable 88 moves downwardly, its upper end, as can be best seen in FIG. 6, will exert tension on the resilient connector 110 thereby causing the lever 112 to move forwardly or to the right as seen in FIG. 6. This movement of the lever 112 will cause corresponding or clockwise movement of the shaft 72 as seen in FIG. 6 thereby lowering the hay feed arms 74 to approximately the dotted line position as seen in FIG. 6.

As the lower position of the hay feed arms 74 is reached, the crank 79 will begin to move downwardly thereby moving the rocker arm 120 downwardly about the center of pivot 122. This will cause a corresponding downward movement of the lower end of the connecting cable 124 and in turn a lateral inward movement of the upper end of the cable 124 with a corresponding inward movement of the rearward end of the support arm 70. The support arm 70 will thus pivot about a vertical axis on the pivot 73. As the rearward end of the support arm 70 moves inwardly or to the right, as viewed in FIG. 2, it will carry with it the shaft 72 and the rearward end of the support arm 68. During this phase of operation the hay carried upwardly from the ground into the proximity of the lateral transport mechanism will be moved centrally or to the right, as viewed in FIG. 2. As the movement of the crank 79 causes the support arms 68 and 70 and the shaft 72 to move to its extreme inward position, the continued rotation of the cam 78 will then allow the follower 86, follower arm 82 and feed arms 74 to be raised by spring 75. As this stage in the cycle of the operation is reached, the end of crank 79 will be elevated thereby elevating the rocker 120 thereby releasing the tension of the cable 124 and allowing the support arm 68, and 70 and support shaft 72 to swing outwardly or to the left as seen in FIG. 2, under the influence of the return spring 140. Since the hay feed arms 74 are moved to an elevated position as they move outwardly, the hay within the lateral transport assembly will not be moved outwardly or to the right or to the left as seen in FIG. 2 as the hay feed arms 74 return to the outward or starting position as shown in dotted lines in FIG. 2.

When the feed arms 74 have reached the dotted line position of FIG. 2, they will again be lowered through the operation of the cam 78, cam follower 86 and cable 88. After they have moved to the lowered position, as seen in dotted lines in FIG. 6, the crank 79 will again cause the rearward ends of the support members 68 and 70 to swing inwardly or to the right as seen in FIG. 2. This cycle is repeated continuously through operation, thereby moving the hay inwardly from the pick-up mechanism 50 in through the inlet opening 33 into the packing mechanism 30. As can be best seen in FIG. 2, by the provision of a pair of rearwardly extending support members 68 and 70 each mounted for pivotal movement about a vertical axis, the outward end of the hay feed arms 74, as well as moving laterally, will also move forwardly and rearwardly and thus by means of the improved lateral transport mechanism, according to my invention, the hay is conveyed rearwardly from the hay pick-up mechanism 50 as well as centrally toward the packing mechanism 30.

It will also be understood that the positions of the lobe on the cam 78 and the position of the crank arm 79 with respect to the throw of the crank 80 will be adjusted such that the hay feed arms 74 will move the hay inwardly or toward the right, as seen in FIG. 2, when the plunger 90 is in its retracted or forward position and it will therefore convey the hay through the inlet opening 33 and into the packing mechanism on the rearward side of the plunger 90. When the plunger 90 moves upwardly and rearwardly, the hay feed arms 74 will be in a raised position and moving outwardly or towards the left, as seen in FIG. 2.

The hay packed within the packing mechanism 30 will move upwardly through the bale case 32 and when a bale of the desired length has been formed, it will be tied conventionally by means of the needle 184 and knotter mechanism 150.

As can be best seen in FIG. 1, the bales 148 are preferably shorter than bales of the conventional length and can, for example, be cubic in shape and of approximately half the length of a conventional bale. The bales, as they are formed, will slide upwardly through the bale case 32 and out through the open top end of the bale case into the curved rearwardly extending drop chute 140. Since the bale case 32 is substantially vertical in position, the bales will be elevated to the required height to drop into a wagon C of a conventional size from the top of the drop chute 140. For this reason, no additional mechanism is required for conveying or throwing the bales from the baler into a wagon. Since the bales 148 are cube shaped, it is not necessary for an operator to be standing within the wagon to position the bales uniformly and evenly as they drop into the wagon. The vertical position of the bale case has additional advantages. It places the center of gravity of the baler further forward thereby reducing the tendency for the baler to lift the front of the tractor. In addition, the vertical position of the bale case shortens the length of the baler A from front to rear and therefore makes it easier for the operator to negotiate turns.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A hay baler comprising in combination; a supporting framework; a packing mechanism mounted thereon; a drive means for operating said packing mechanism, said packing mechanism having an inlet opening therein and an outlet opening through which bales formed within said packing mechanism pass out of said baler; a pick-up means mounted laterally of said packing mechanism for picking up hay from the ground and carrying it into said baler; a lateral transport mechanism mounted upon said framework and communicating between said pick-up mechanism and said packing mechanism for transporting the hay picked up by the said pick-up mechanism into said inlet opening, said lateral transport mechanism having a movably mounted supporting member, said supporting member being movable along an axis extending laterally of said baler, a plurality of laterally spaced apart feed arms mounted upon said supporting member and a drive means for imparting oscillatory movement to said supporting member along said axis; a means operatively associated with the feed arms for rendering the feed arms inoperative in each portion of the cycle of oscillation during which the feed arms move outwardly from said packing mechanism, a means for affixing a retaining member to the bales formed by said baler, said supporting member comprising a horizontally disposed laterally extending elongate member which is mounted upon a pair of laterally spaced apart longitudinally extending supporting members, each of said supporting members being mounted upon said framework for pivotal movement about a vertical axis.

2. A hay baler comprising in combination; a supporting framework; a packing mechanism mounted thereon; a drive means for operating said packing mechanism, said packing mechanism having an inlet opening therein and an outlet opening through which bales formed within said packing mechanism pass out of said baler; a pick-up means mounted laterally of said packing mechanism for picking up hay from the ground and carrying it into said baler; a lateral transport mechanism mounted upon said framework and communicating between said pick-up mechanism and said packing mechanism for transporting the hay picked up by the said pick-up mechanism into said inlet opening, said lateral transport mechanism having a movably mounted supporting member, said supporting member being movable along an axis extending laterally of said baler, a plurality of laterally spaced apart feed arms mounted upon said supporting member and a drive means for imparting oscillatory movement to said supporting member along said axis; a means operatively associated with the feed arms for rendering the feed arms inoperative in each portion of the cycle of oscillation during which the feed arms move outwardly from said packing mechanism, a means for affixing a retaining member to the bales formed by said baler, said means for rendering said feed arms inoperative comprising means for simultaneously elevating the free ends of said feed arms during the portion of the cycle of oscillation in which said feed arms move outwardly from said packing mechanism, said means for elevating said feed arms including a cam member having a cam lobe, said cam being rotatably mounted within said framework, a cam follower member operatively associated with said cam member and connecting means secured at one end thereof to said cam follower means at the opposite end thereof to said supporting member for imparting an oscillating movement to said supporting member in correspondence with the movement of said cam lobe over said cam follower member.

3. In a hay baler having a packing mechanism and a pick-up means for carrying the cut hay from the ground into the baler; a lateral transport mechanism mounted upon said framework between said hay pick-up means and said packing means, said lateral transport mechanism comprising a pair of laterally spaced apart vertically extending support arms pivotally mounted upon said framework at the lower end thereof for pivotal movement about a vertical axis, said support arms including rearwardly extending portions at the upper end thereof; a horizontally disposed laterally extending elongate support member pivotally secured at the rearward ends of both of said portions for pivotal movement about a vertical axis with respect to said portions, said elongate member also being mounted for pivotal movement about the longitudinal axis thereof; a plurality of laterally spaced apart downwardly curved feed arm members rigidly secured to said elongate support member; a drive means for oscillating said support member on a laterally extending axis; a drive means for pivoting the elongate support member about the longitudinal axis thereof in a direction adapted to raise the free ends of said feed arms to an elevated position during the portion of the cycle of lateral oscillation in which said support member swings outwardly and for pivoting said support member about said axis in a direction adapted to lower the free ends of said feed arms during the portion of the cycle of oscillation in which said support member swings inwardly toward said packing mechanism.

4. A hay baling apparatus comprising in combination; a framework; a packing mechanism mounted upon said framework; a bale case mounted upon said packing mechanism; a pick-up mechanism connected to said framework and spaced laterally of said packing mechanism for picking up hay from the ground; a lateral transport mechanism mounted upon said framework between said pick-up mechanism and said packing mechanism; said lateral transport mechanism comprising a pair of laterally spaced apart vertically extending support arms pivotally mounted at their lower ends upon said framework for pivotal movement about a vertical axis, rearwardly extending portions at the upper ends of said support arms, a laterally extending horizontally disposed elongate support member pivotally connected to the rearward ends of each of said support arms for pivotal movement with respect to said arms about a vertical axis, said elongate support member also being pivotally mounted at the rearward ends of said portions for movement about the longitudinal axis of said support member, a plurality of forwardly extending downwardly curved and laterally spaced apart feed arms rigidly connected to said elongate support member; a drive means for operating said lateral transport mechanism, said drive means comprising a cam member including a cam lobe mounted upon said framework for rotation about a horizontally disposed axis, a cam follower arm pivotally mounted upon said framework and operatively associated with said cam to swing upwardly and downwardly in correspondence with the peripheral contour of said cam, a flexible elongate connecting means secured at one end thereof to said cam follower arm and at the other end thereof to said elongate supporting member, and a resilient means for yieldably biasing said elongate supporting member against the retention of said elongate connecting member, a crank means rigidly connected to said cam member, a second elongate connecting member rotatably secured at one end thereof to said crank and operatively connected at the other end thereof to the rearward end of one of said support arms, the movement of said crank member being adapted to exert tension upon said second connecting member to thereby swing the rearward end of said connecting member along a horizontally disposed laterally extending path and a second resilient member operatively connected between said lateral transport assembly and said framework for yieldably biasing said support arms and supporting member about said vertical axis against the retention of said second elongate connecting means and said crank means being positioned relative to the lobe of said cam to swing said feed arms inwardly toward said packing mechanism when the free ends of said feed arms are lowered and to swing said feed arms outwardly when the free end of said feed arms are in an elevated position.

5. The apparatus according to claim 4 wherein said packing mechanism comprises a casing, a plunger mounted within said casing for oscillatory movement, a drive means for oscillating said plunger within said casing, said plunger drive means being operatively associated said drive means for said lateral transport mechanism to oscillate said plunger within said casing to a retracted position during the movement of said feed arms toward said packing mechanism.

6. The apparatus according to claim 5 wherein said packing mechanism comprises a casing; a horizontally disposed laterally extending pivot member positioned at the upper end of said casing; a vane mounted upon said pivot and extending laterally within said casing, said vane being adapted to swing forwardly and rearwardly about said pivot, said casing having an upwardly curved bottom wall positioned adjacent the path of movement of the lower end of said vane and an upward wall comprising a plurality of laterally spaced apart longitudinally extending rib members, said rib members being curved upwardly at the forward and rearward ends thereof and a drive means operatively connected to said vane for oscillating said vane within said casing about said pivot, said drive means comprising a crank rotatably mounted within said casing and a connecting rod secured between said crank and said vane whereby rotational movement of said crank will impart an oscillatory movement to said vane.

7. The combination according to claim 6 for operation in conjunction with a tractor including rearwardly extending vertically swinging powered hitch links, the provision of the forward end of said baler of a plurality of vertically spaced apart connecting members for securing said baler to the rearward ends of said hitch links.

8. The apparatus according to claim 7 wherein said bale case communicates with the outlet of said packing mechanism and extends substantially vertically therefrom.

9. The apparatus according to claim 8 wherein an upwardly and then rearwardly extending guide chute is secured to the upward end of said bale case for conveying bales from said bale case rearwardly of said baler.

References Cited in the file of this patent

UNITED STATES PATENTS

| | | |
|---|---|---|
| 2,030,031 | Innes | Feb. 4, 1936 |
| 2,431,828 | Raney | Dec. 2, 1947 |
| 2,720,073 | Freeman et al. | Oct. 11, 1955 |
| 2,760,625 | Lohnert | Aug. 28, 1956 |
| 2,816,502 | Eismann | Dec. 17, 1957 |
| 2,920,752 | Heinlein et al. | Jan. 12, 1960 |
| 2,970,423 | Wenzel | Feb. 7, 1961 |